Oct. 1, 1963
L. R. BELL ETAL
3,105,361
ZERO GRAVITY VENT SYSTEM
Filed Nov. 20, 1961
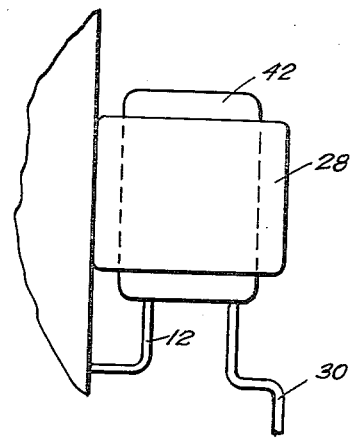
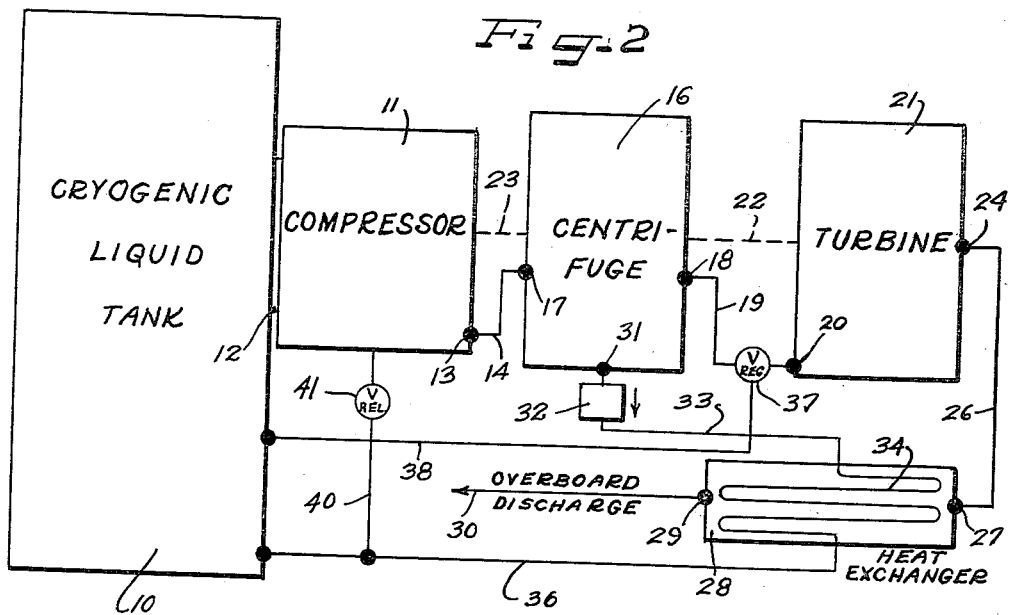
INVENTOR.
Leo R. Bell
BY Harold E. Britton, Jr.
Hill, Sherman, Meroni, Gross & Simpson
ATTORNEYS

3,105,361
ZERO GRAVITY VENT SYSTEM

Leo R. Bell, Sherman Oaks, and Harold E. Britton, Jr., Woodland Hills, Calif., assignors to Thompson Ramo Wooldridge Inc., Cleveland, Ohio, a corporation of Ohio Filed Nov. 20, 1961, Ser. No. 169,160
10 Claims. (Cl. 62—50)
(Filed under Rule 47(a) and 35 U.S.C. 116)

This invention relates generally to hydraulic apparatus and more particularly relates to a venting system for a liquid storage means whereby venting may be accomplished even under zero gravity conditions.

Under zero gravity conditions, gases in any storage tank for liquids may occur in any physical location within the interior of the tank, for example, either at the top of the tank, the bottom of the tank, or at any intermediate section thereof.

A vehicle adapted to be subjected to the zero gravity operating environment of outer space may include a storage tank for liquids wherein solar heat input will increase the pressure of the tank and gases must be vented from the tank to prevent rupture. A special problem is thus presented in that it is necessary to vent only the gas from the system without loss of the liquid stored in the tank.

In accordance with the method and apparatus contemplated by the present invention, a supply of fluid from the tank is driven in the form of a stream through a closed circuit and at one point in the circuit the stream is subjected to a centrifuging operation to divide the stream into a liquid phase and a gaseous phase. At a second point in the circuit and specifically in the gaseous phase, the gaseous components of the stream are expanded to drive a turbine motor. At a third point in the circuit the spent expanded gases are passed in heat exchange relation with the liquid phase of the stream, whereupon the gases are vented out of the system and the cooled liquid is recycled back to the supply tank. The rate of gas bleed from the system is controlled by a valve sensing tank pressure, which valve is positioned between the gas outlet from the centrifuge and the gas inlet to the turbine. A pressure relief valve can also be provided in a bypass line between the compressor and the tank so the fluid will be bypassed directly to the tank when the stream of fluid is substantially wholly liquid.

It is an object of the present invention, therefore, to provide an improved venting system for a liquid storage apparatus adapted to be subjected to zero gravity environmental conditions.

Another object of the present invention is to provide a venting arrangement for a liquid storage system in an outer space vehicle.

Yet another object of the present invention is to provide a zero gravity venting system which is particularly adaptable for use in a cryogenic fuel-operated outer space vehicle.

Many other advantages, features and additional objects of the present invention will become manifest to those versed in the art upon making reference to the detailed description which follows and the accompanying sheet of drawings in which a preferred structural embodiment capable of practicing the methods contemplated by the present invention is shown by way of illustrative example.

On the drawings:

FIGURE 1 is an elevational view showing an exemplary installation of a package unit including an axial flow compressor, a centrifuge, a turbine and a heat exchanger, all mounted on the side of a storage tank; and FIGURE 2 is a plumbing diagram showing additional details of construction of the packaged installation of FIGURE 1.

As shown on the drawings:

Although the principles of the present invention are of general applicability to any venting system for a liquid storage arrangement adapted to be subjected to zero gravity conditions, a particularly useful application is made to a cryogenic fuel-operated outer space vehicle wherein a tank is provided at 10 which is adapted to contain liquid fuel, thereby functioning as a source of supply. In such an arrangement, the solar heat input will increase the pressures within the tank 10 and the gases must be vented from the tank 10 to prevent rupture.

Because the tank 10 is subjected to zero gravity conditions, the gases may occur at any position within the interior of the tank and a special problem is presented in connection with the venting of only the gases without incurring any loss of liquid fuel.

It is contemplated by the present invention, therefore, to provide a compressor 11 which is in full flow communication with the interior of the tank 10. The compressor 11 preferably comprises an axial mixed flow compressor and operates to drive a supply fluid drawn from the tank 10 in the form of a stream. The compressor has an inlet shown at 12 and an outlet shown at 13 which is connected by way of conduit means 14 to a centrifuge 16.

The centrifuge separates the stream into a gaseous phase and a liquid phase.

The stream of fluid enters the centrifuge at a centrifuge inlet shown at 17. The gaseous phase exits the centrifuge 16 at a gaseous phase outlet 18 and is carried by a conduit means 19 to an inlet 20 of a turbine 21. In the turbine 21, the gases of the gaseous phase of the stream are expanded, thereby to drive a turbine wheel which is drivingly connected by appropriate mechanical connections shown at 22 and 23 to drivingly rotate the centrifuge 16 and the impeller means of the axial mixed flow compressor 11.

The expanded spent gases exit the turbine 21 via a turbine outlet 24 and are carried by a conduit means 26 to a gas inlet 27 of a heat exchanger 28. The heat exchanger 28 has a gas outlet 29 connected to a venting conduit 30 by means of which the gas may be vented outwardly of the system through an overboard discharge.

The liquid phase of the stream exits the centrifuge 16 via a liquid outlet 31 through a collecting sump 32 and via a conduit means 33 connected to coils 34 arranged within the heat exchanger 28, thereby to be cooled by the gases from the turbine 21 which are cooled by expansion through the turbine system and which are fed to the heat exchanger 28 for cooling the liquid from the centrifuge 16. A conduit means 36 carries the cooled liquid from the coils 34 back to the tank 10.

In order to control the rate of gas bleed from the system, a regulator means is shown at 37. The regulator means conveniently comprises a pressure sensitive valve which is located in the conduit 19 between the centrifuge 16 and the turbine 21 and specifically between the gas outlet 18 of the centrifuge 16 and the gas inlet 20 of the turbine 21. It will be understood the pressure sensitive regulating means 37 may comprise pressure-sensitive elements which are subject to and responsive to the pressures in the tank 10, appropriate communication being provided between the regulator means 37 and the tank 10 by means of a pressure sensing line shown at 38. For illustrative purposes, the regulating means 37 may take the form of a control valve which is diaphragm-actuated from tank pressure. The diaphragm may conveniently actuate a needle controlling the flow of gas through the conduit 19 for expansion through the turbine 21.

It is further contemplated by the present invention to provide bypass means between the compressor 11 and the tank 10. A bypass line is shown at 40 and includes a pressure relief valve 41. Accordingly, whenever the stream of fluid driven by the compressor is substantially wholly liquid, the stream is directly bypassed from the axial mixed flow compressor 11 through the conduit 40 and directly back into the tank 10.

A typical actual hardware installation is shown in FIGURE 1 wherein the compressor 11, the centrifuge 16 and the turbine 21 are constructed in one unit and include a common casing 42. The heat exchanger 28 may conveniently surround the casing 42, thereby permitting the entire package to take a particularly compact form.

Although minor modifications might be suggested by those versed in the art, it should be understood that we wish to embody within the scope of the patent warranted hereon all such modifications as reasonably and properly come within the scope of our contribution to the art.

We claim as our invention:

1. A zero gravity venting system comprising an axial mixed flow compressor having an inlet and an outlet, a storage tank adapted to contain a supply of fluid in liquid and vapor phases, said inlet connected to said tank, whereby said compressor will drive a supply of fluid from the tank in the form of a stream, a centrifuge connected to said outlet and receiving the stream of fluid driven by the compressor, thereby to divide the stream into separate streams of liquid and gas, a turbine having a driving connection with said compressor and said centrifuge and receiving the stream of gas from said centrifuge, thereby to drive the compressor, and a heat exchanger having one side thereof connected to said centrifuge and to said tank for receiving the stream of liquid from said centrifuge and for returning the liquid to said tank, the other side of said heat exchanger being connected to said turbine and to a vent for receiving spent gases expanded through said turbine to cool the stream of liquid and venting the gases outwardly of the system.

2. A zero gravity venting system comprising an axial mixed flow compressor having an inlet and an outlet, a storage tank adapted to contain a supply of fluid in liquid and vapor phases, said inlet connected to said tank, whereby said compressor will drive a supply of fluid from the tank in the form of a stream, a centrifuge connected to said outlet and receiving the stream of fluid driven by the compressor, thereby to divide the stream into separate streams of liquid and gas, a turbine having a driving connection with said compressor and said centrifuge and receiving the stream of gas from said centrifuge, thereby to drive the compressor, and a heat exchanger having one side thereof connected to said centrifuge and to said tank for receiving the stream of liquid from said centrifuge and for returning the liquid to said tank, the other side of said heat exchanger being connected to said turbine and to a vent for receiving spent gases expanded through said turbine to cool the stream of liquid and venting the gases outwardly of the system, and bypass means including a pressure relief valve to bypass the stream of fluid driven by the compressor directly from said compressor to said tank whenever the stream of fluid is substantially wholly liquid.

3. A zero gravity venting system comprising an axial mixed flow compressor having an inlet and an outlet, a storage tank adapted to contain a supply of fluid in liquid and vapor phases, said inlet connected to said tank, whereby said compresosr will drive a supply of fluid from the tank in the form of a stream, a centrifuge connected to said outlet and receiving the stream of fluid driven by the compressor, thereby to divide the stream into separate streams of liquid and gas, a turbine having a driving connection with said compressor and said centrifuge and receiving the stream of gas from said centrifuge, thereby to drive the compressor, and a heat exchanger having one side thereof connected to said centrifuge and to said tank for receiving the stream of liquid from said centrifuge and for returning the liquid to said tank, the other side of said heat exchanger being connected to said turbine and to a vent for receiving spent gases expanded through said turbine to cool the stream of liquid and venting the gases outwardly of the system, and a pressure-sensitive regulating valve interposed between said centrifuge and said turbine and including actuating means responsive to the pressure in said tank, thereby to operate said turbine as a function of tank pressure.

4. The method of venting gas from a confined source of supply of fluid having liquid and gaseous components, which includes the steps of driving a supply of fluid from said source of supply in the form of a stream through a closed circuit, at one point in the circuit subjecting the stream to a centrifuging operation to divide the stream into a liquid phase and a gaseous phase, at a second point in the circuit and specifically in the gaseous phase, expanding the gases in the gaseous phase to drive a turbine motor, at a third point in the circuit passing the expanded gases from the turbine motor in heat exchange relation with the liquid phase of the stream, venting the gaseous phase of the stream out of the circuit and recycling the cooled liquid phase of the stream back to the source of supply.

5. The method of venting gas from a confined source of supply of fluid in liquid and vapor phases which includes the steps of driving a supply of fluid from the source in the form of a stream through a closed circuit, at one point in the circuit subjecting the stream to a separating action to divide the stream into a liquid phase and a gaseous phase, at a second point in the circuit expanding the gases in the gaseous phase to drive a turbine motor, expanding the gases in the gaseous phase as a function of the gas pressure in the source of supply, at a third point in the circuit passing the expanded gases in heat exchange relation with the liquid phase of the circuit, venting the gases out of the system, and recycling the cooled liquid back to the source of supply.

6. The method of venting gas from a confined source of supply of fluid in liquid and vapor phases which includes the steps of driving a supply of fluid from the source in the form of a stream through a closed circuit, at one point in the circuit subjecting the stream to a separating action to divide the stream into a liquid phase and a gaseous phase, at a second point in the circuit expanding the gases in the gaseous phase to drive a turbine motor, expanding the gases in the gaseous phase as a function of the gas pressure in the source of supply, at a third point in the circuit passing the expanded gases in heat exchange relation with the liquid phase of the circuit, venting the gases out of the system, and recycling the cooled liquid back to the source of supply, and bypassing fluid from ahead of said one point in the circuit directly to said source of supply only when the supply of fluid is substantially wholly liquid.

7. A zero gravity venting system comprising a tank forming a source of supply of fluid having liquid and gaseous components, a compressor connected to said tank and compressing a supply of fluid for driving the fluid in the form of a stream, conduit means forming a closed circuit through which said stream of fluid is driven, a centrifuge in said circuit dividing the stream into a gaseous phase and a liquid phase, a turbine in the gaseous phase of said circuit through which the gaseous phase is expanded to drive the turbine, said turbine having a driving connection with said centrifuge and with said compressor, a heat exchanger in said circuit receiving the spent expanded gases and the liquid phase of said stream in heat exchange relation, said heat exchanger having a vent to discharge the gaseous fluid out of the system, and being connected to said tank to recycle the cooled liquid phase of the stream back to said source of supply.

8. A zero gravity venting system comprising a tank forming a source of supply of fluid having liquid and gaseous components, a compressor connected to said tank and compressing a supply of fluid for driving the fluid in the form of a stream, conduit means forming a closed circuit through which said stream of fluid is driven, a centrifuge in said circuit dividing the stream into a gaseous phase and a liquid phase, a turbine in the gaseous phase of said circuit through which the gaseous phase is expanded to drive the turbine, said turbine having a driving connection with said centrifuge and with said compressor, a heat exchanger in said circuit receiving the spent expanded gases and the liquid phase of said stream in heat exchange relation, said heat exchanger having a vent to discharge the gaseous fluid out of the system, and being connected to said tank to recycle the cooled liquid phase of the stream back to said source of supply, a pressure regulator in said circuit for regulating the expansion of gas through said turbine and including pressure-sensitive actuating means responsive to the pressure in said tank, thereby to operate said turbine as a function of the pressure at said source of supply.

9. A zero gravity venting system comprising a tank forming a source of supply of fluid having liquid and gaseous components, a compressor connected to said tank and compressing a supply of fluid for driving the fluid in the form of a stream, conduit means forming a closed circuit through which said stream of fluid is driven, a centrifuge in said circuit dividing the stream into a gaseous phase and a liquid phase, a turbine in the gaseous phase of said circuit through which the gaseous phase is expanded to drive the turbine, said turbine having a driving connection with said centrifuge and with said compressor, a heat exchanger in said circuit receiving the spent expanded gases and the liquid phase of said stream in heat exchange relation, said heat exchanger having a vent to discharge the gaseous fluid out of the system, and being connected to said tank to recycle the cooled liquid phase of the stream back to said source of supply, and bypass means between said compressor and said tank including a pressure relief valve to bypass fluid directly to said tank whenever the stream of fluid is substantially wholly liquid.

10. A zero gravity venting system comprising a tank forming a source of supply of fluid having liquid and gaseous components, a compressor connected to said tank and compressing a supply of fluid for driving the fluid in the form of a stream, conduit means forming a closed circuit through which said stream of fluid is driven, a centrifuge in said circuit dividing the stream into a gaseous phase and a liquid phase, a turbine in the gaseous phase of said circuit through which the gaseous phase is expanded to drive the turbine, said turbine having a driving connection with said centrifuge and with said compressor, a heat exchanger in said circuit receiving the spent expanded gases and the liquid phase of said stream in heat exchange relation, said heat exchanger having a vent to discharge the gaseous fluid out of the system, and being connected to said tank to recycle the cooled liquid phase of the stream back to said source of supply, said compressor comprising an axial mixed flow compressor.

References Cited in the file of this patent
UNITED STATES PATENTS

| | | |
|---|---|---|
| 2,467,413 | Wildhack | Apr. 19, 1949 |
| 2,489,514 | Benz | Nov. 29, 1949 |
| 2,641,907 | Baucom | June 16, 1953 |
| 3,059,441 | Werner | Oct. 23, 1962 |